R. McNULTY.
Car-Truck.

No. 167,406. Patented Sept. 7, 1875.

WITNESSES:
John E. Bauman
Lewis Holmes.

INVENTOR.
Richard McNulty.

UNITED STATES PATENT OFFICE.

RICHARD McNULTY, OF NASHVILLE, TENNESSEE.

IMPROVEMENT IN CAR-TRUCKS.

Specification forming part of Letters Patent No. 167,406, dated September 7, 1875; application filed November 4, 1874.

*To all whom it may concern:*

Be it known that I, RICHARD MCNULTY, of Nashville, in the county of Davidson, State of Tennessee, have invented a certain new and useful Improvement in Railway-Car Trucks, of which the following is a description and specification:

My invention consists in the device for supporting the framing of the body of the truck on the wheels and axles of the same, said device consisting of the combination of springs, spring-levers, equalizing-levers, and stirrups, hereinafter fully described and claimed.

Figure 1:
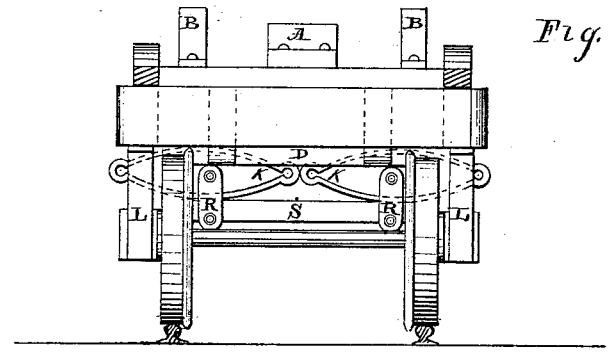
Figure 2:
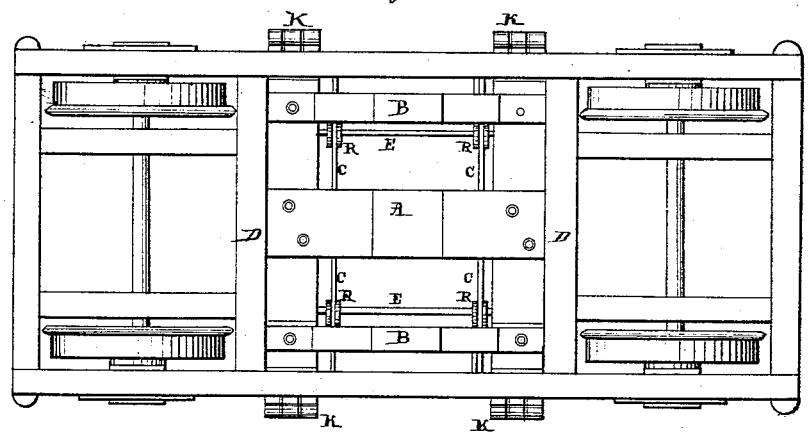
Figure 3:
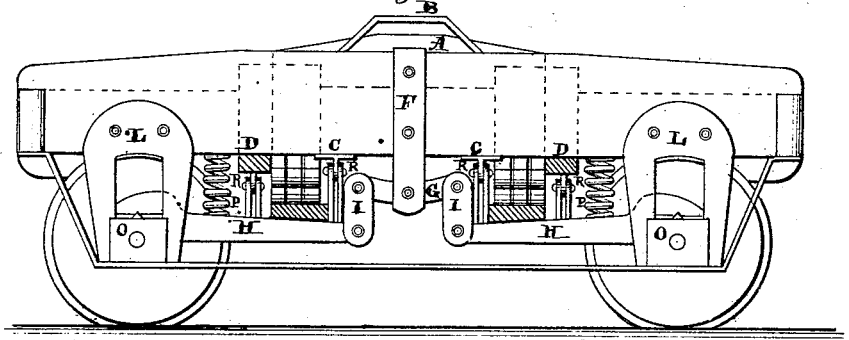

Figure 1 is an end view of the truck-frame, showing the wheels, axles, pedestals, and boxes placed and fastened under the truck in the usual manner. Fig. 2 is a top view of said truck-frame, showing the same arrangement of the wheels and axles as above in Fig. 1. Fig. 3 is a side view of said truck-frame, showing the arrangement and combination of the manner of supporting the body of the truck on the wheels and axles, through the medium of the springs P P, spring-levers H H, straps I I, equalizing-lever G, and stirrup F.

I construct the body of the frame of the truck in the usual manner, and use the ordinary wheels, axles, pedestals, and boxes; but, to apply and equalize and utilize the elasticity of the springs P P (which can be made of any material usually used, such as metallic spiral, rubber, or other material) for the support and easy carriage of the body of the truck, I make use of the following-described arrangement and combination, viz: I form and use the spring-levers H H, as shown in Fig. 3, having one end of each resting on the axle-boxes O O in the pedestals L L, and their other ends attached to an equalizing-lever, G, by the straps I I, by means of round bolts or pins, which lever G is supported and suspended in the stirrup F by a round bolt or pin, or its equivalent, so as to permit the ends of the equalizing-lever G to move up and down, as demanded when the strain of the irregularities of the track is thrown on the axle-boxes O O and the spring-levers H H, and the springs P P. The stirrup F is fastened rigidly to the body of the frame of the truck.

This combination and arrangement is used on each side of the truck, and in this manner I can impart a steadier and easier motion to the truck when moving on the track.

Having thus fully described the manner of constructing and operating my invention, I do not claim the device for supporting the body of the car proper on the truck by and through the medium of a system of nests of elliptical springs under the center-pin bolster-frame of the truck, which is shown in the drawings, as this device and combination forms the subject of another application for a patent.

I claim as my invention—

The combination, with a four-wheel truck, of the springs P P, spring-levers H H, straps I I, lever G, and stirrup F, substantially as and for the purposes set forth.

RICHARD McNULTY.

Witnesses:
JOHN E. BAUMAN,
D. N. NOYLAN.